(No Model.)
R. RIGBY.
LOOM TEMPLE.
No. 515,720.
Patented Feb. 27, 1894.
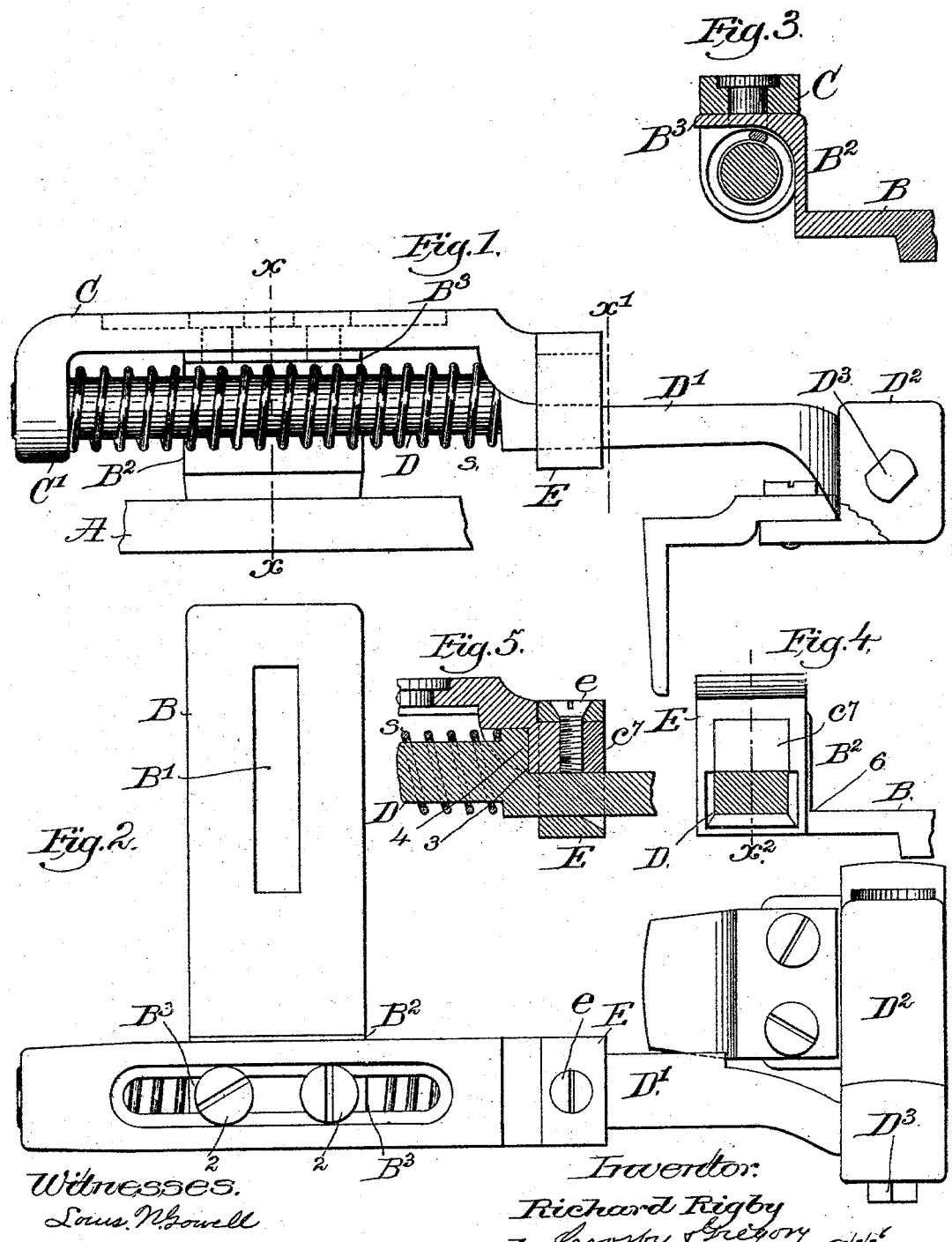
Witnesses.
Louis N. Cowell
Edward F. Allen
Inventor:
Richard Rigby
by Crosby & Gregory attys.

UNITED STATES PATENT OFFICE.

RICHARD RIGBY, OF FALL RIVER, MASSACHUSETTS.

LOOM-TEMPLE.

SPECIFICATION forming part of Letters Patent No. 515,720, dated February 27, 1894.

Application filed November 28, 1892. Serial No. 453,352. (No model.)

*To all whom it may concern:*

Be it known that I, RICHARD RIGBY, of Fall River, county of Bristol, State of Massachusetts, have invented an Improvement in Loom-Temples, of which the following description, in connection with the accompanying drawings, is a specification, like letters and numerals on the drawings representing like parts.

Many manufacturers are frequently called upon to make special goods, the width of which is stated by the purchaser. In this class of work, it is desired to be able to weave the goods required on the looms which the manufacturers have, or in other words, it is very desirous to be able to weave different widths of goods on the same loom. In providing however, for this class of work, difficulty is frequently experienced because of the temple not being adapted to take care of the new width.

In accordance with this invention, the temple stand or part adapted to be secured to the breast beam, has been provided with an upright having a screw-holding lip which serves to support the guide in which slides the shank of the temple, the said guide having at one end a downwardly extended ear which constitutes one of the bearings for the temple shank, the other end of the guide supporting a bearing which in the form in which my invention is herein contained, is made as a detachable loop, said loop constituting the second bearing in which the temple bar slides in operation.

Figure 1, in side elevation represents a temple embodying my invention. Fig. 2, is a plan view thereof. Fig. 3, is a partial section in the line $x$, Fig. 1; Fig. 4 a partial section in the line $x'$, Fig. 1, and Fig. 5, a section in the line $x^2$, Fig. 4.

Referring to the drawings, let A represent a portion of the breast beam of a loom. Upon this breast beam, I mount a temple stand B, consisting essentially of a plate having a slot B' through which and into the breast beam, may be extended any suitable screw or bolt by which to attach the stand in adjustable manner upon the breast beam, so that the said stand may be moved toward and from the longitudinal center of the loom. This stand near its outer end, see Fig. 4, where the slotted part of the stand is broken off to save space in the drawings, has an upright $B^2$, shown also in Fig. 1, the upper part of which has a lip $B^3$. This lip $B^3$ has a flat upper side which supports the guide C, the said guide being represented as attached adjustably to the said lip by suitable screws 2.

The guide C has at one end a depending bearing C' to receive the shank D of the temple carrying bar D' having at its inner end a temple head $D^2$ which may be of any usual or suitable construction, the said head consisting of a cap, pod and roll, the cap being shown as held in place by a bolt $D^3$. The end of the guide C opposite that one having the bearing C', is shaped to present a projecting tongue $c^7$ and a shoulder 3, the latter serving to receive against it the shoulder 4 forming part of the shank D, which is surrounded by the usual spring $s$. The projecting tongue $c^7$ serves to support a bearing loop E, which is held in place by a set screw $e$, shown in Figs. 2 and 5, the said loop constituting the second bearing for the sliding bar of the temple, the bar being readily removed from the guide by removing the screw $e$ and bearing loop from the tongue $c^7$, the opening in the bearing loop being sufficient to enable the bar to be drawn out through it.

By the employment of a temple, such as herein shown, the selvage of the cloth being woven may come clear up to the corner 6, shown in Fig. 4.

It will be noticed, in accordance with my invention, that the bearing in which the temple bar slides is projected downwardly from the guide C, thus leaving an open space below the bearing, in which the cloth may move and be manipulated, and it will also be noticed that the loop E which depends from the guide C also supports the weight of and constitutes one of the bearings for the temple-bar.

Having described my invention, what I claim, and desire to secure by Letters Patent, is—

The herein described loom temple, it consisting essentially of a temple-bar having a shoulder 4, a temple-head attached to said bar, a stand having an upright provided with an overhanging lip, a guide C mounted on said stand, said guide having at one end a downwardly extended bearing, and at its other end a tongue $c^7$ provided with a shoulder, a detachable bearing loop supported by the said tongue and constituting a second bearing for the temple bar in its sliding movement, the parts being combined and operating, substantially as described.

In testimony whereof I have signed my name to this specification in the presence of two subscribing witnesses.

RICHARD RIGBY.

Witnesses:
ALFRED H. HOOD,
ARBA N. LINCOLN.